(12) United States Patent
Bhatnagar

(10) Patent No.: US 7,734,699 B2
(45) Date of Patent: Jun. 8, 2010

(54) INTERVIEW AUTOMATION SYSTEM FOR PROVIDING TECHNICAL SUPPORT

(76) Inventor: Himanshu Bhatnagar, 171 Laconia Cr., North Andover, MA (US) 01845

( * ) Notice: Subject to any disclaimer, the term of this patent is extended or adjusted under 35 U.S.C. 154(b) by 955 days.

(21) Appl. No.: 10/654,397

(22) Filed: Sep. 3, 2003

(65) Prior Publication Data

US 2004/0054693 A1 Mar. 18, 2004

Related U.S. Application Data

(60) Provisional application No. 60/408,139, filed on Sep. 3, 2002.

(51) Int. Cl.
*G06F 15/16* (2006.01)
*G06F 15/18* (2006.01)
*G06F 17/00* (2006.01)
*G06N 5/00* (2006.01)

(52) U.S. Cl. .................. 709/206; 709/204; 706/14; 706/45

(58) Field of Classification Search ................ None
See application file for complete search history.

(56) References Cited

U.S. PATENT DOCUMENTS

| | | | | |
|---|---|---|---|---|
| 5,963,931 A * | 10/1999 | Fagg et al. | ............ | 706/50 |
| 6,035,283 A | 3/2000 | Rofrano | | |
| 6,112,049 A * | 8/2000 | Sonnenfeld | ............ | 434/350 |
| 6,167,395 A * | 12/2000 | Beck et al. | ............ | 707/3 |
| 6,421,706 B1 | 7/2002 | McNeill et al. | | |
| 6,498,921 B1 | 12/2002 | Ho et al. | | |
| 6,675,149 B1 | 1/2004 | Ruffin et al. | | |
| 6,721,756 B2 | 4/2004 | Yagihashi et al. | | |
| 6,725,209 B1 * | 4/2004 | Iliff | ............ | 706/45 |
| 6,728,679 B1 * | 4/2004 | Strubbe et al. | ............ | 704/270.1 |
| 6,731,307 B1 * | 5/2004 | Strubbe et al. | ............ | 715/727 |
| 6,757,365 B1 * | 6/2004 | Bogard | ............ | 379/88.17 |
| 6,795,808 B1 * | 9/2004 | Strubbe et al. | ............ | 704/275 |
| 6,826,540 B1 * | 11/2004 | Plantec et al. | ............ | 705/10 |
| 7,013,263 B1 * | 3/2006 | Isaka et al. | ............ | 704/9 |
| 7,162,508 B2 * | 1/2007 | Messina | ............ | 709/200 |
| 7,225,233 B1 * | 5/2007 | Fenton | ............ | 709/207 |
| 2001/0029322 A1 * | 10/2001 | Iliff | ............ | 600/300 |
| 2001/0049688 A1 * | 12/2001 | Fratkina et al. | ............ | 707/104.1 |
| 2001/0054064 A1 * | 12/2001 | Kannan | ............ | 709/203 |
| 2002/0138588 A1 * | 9/2002 | Leeds | ............ | 709/217 |
| 2004/0044542 A1 * | 3/2004 | Beniaminy et al. | ............ | 705/1 |
| 2005/0055321 A1 * | 3/2005 | Fratkina et al. | ............ | 706/45 |

OTHER PUBLICATIONS

Ask Jeeves. Sep. 3, 2003 <http://www.ask.co.uk>.
NoHold, Sep. 3, 2003 <http://www.nohold.com>.
Microsoft Research—Once Upon a Chat Room. Sep. 2, 2003 <http://research.microsoft.com/research/scg/leadline.aspx>.
Ubiquity—An ACM IT Magazine and Forum. Sep. 2, 2003 <http://www.acm.org/ubiquity/views/m_thirunarayanan_2.html>.

* cited by examiner

*Primary Examiner*—John B. Walsh
(74) *Attorney, Agent, or Firm*—Pandiscio & Pandiscio

(57) ABSTRACT

A system for providing highly automated technical support to the customer while simultaneously capturing the knowledge base associated with recurring customer questions.

8 Claims, 6 Drawing Sheets

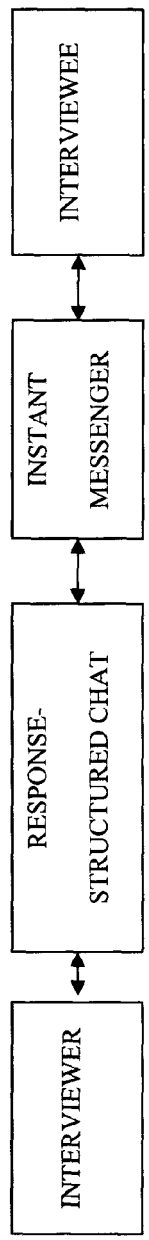

| | Interviewee Side of Chat | Interviewer Side of Chat | |
|---|---|---|---|
| 1. Initial Question from User | User: I am not receiving my emails. Can you help? | User: I am not receiving my emails. Can you help? | 2. Helpdesk Expert Receives the request and types |
| 3. User Sees the following in his browser (or any other window) | Please check to see if your internet is working ?<br>o Yes<br>o No<br>o Other | Question: Please check to see if your internet is working?<br>Choices: Yes, No | 4. Expert reviews the user answer and asks the next question |
| 5. User responds by clicking on the radio button | Please check the back of your computer, is the Ethernet cable connected ?<br>o Yes<br>o No<br>o Other | User: No<br>Question: Please check the back of your computer, is the Ethernet cable connected ?<br>Choices: Yes, No | 6. Expert reviews the user answer and asks the next question |
| 7. User responds by clicking on the radio button | Please re-connect the cable. Is your email working now?<br>o Yes<br>o No<br>o Other | User: No<br>Question: Please re-connect the cable. Is your email working now?<br>Choices: Yes, No | 8. Expert determines the issue it closed, after confirming with user. |
| 9. End of Interview | *Your issue is resolved. Have a good day* | Text: Your issue is resolved. Have a good day | |

Figure 4a: A Dialog/Interview between an expert and a user to resolve a 'recurring' technical support issue, using the Structured Chat Format.

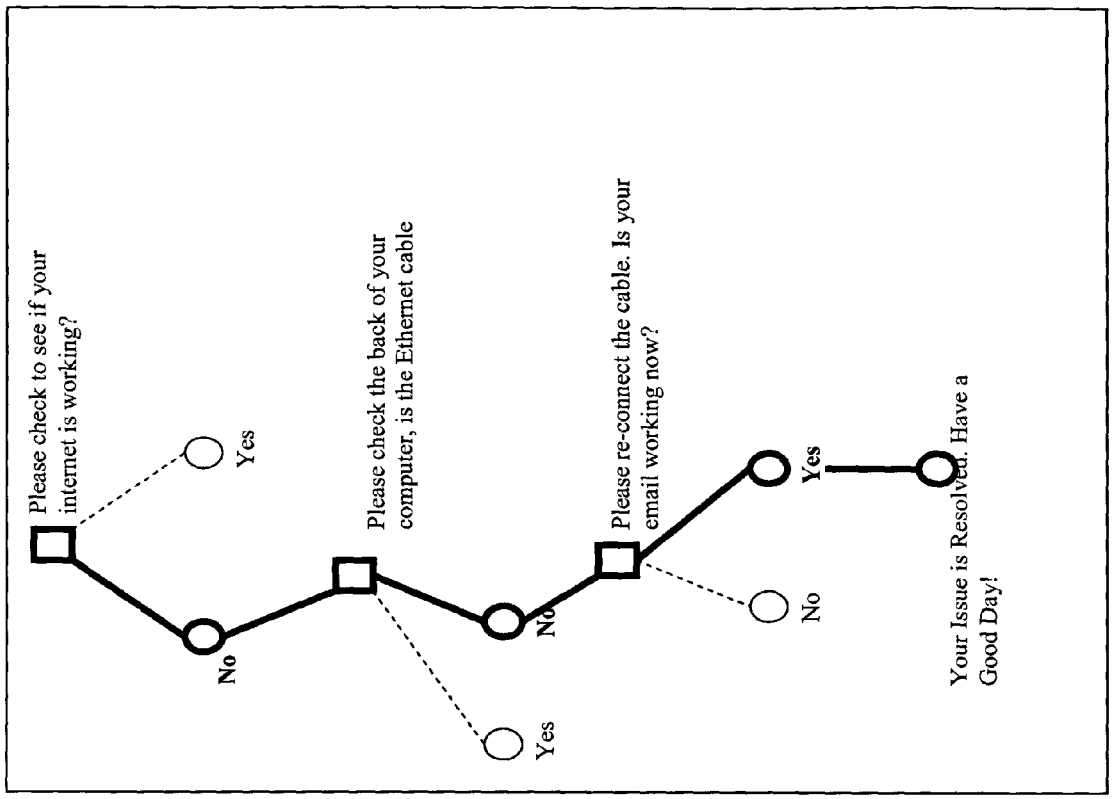
Figure 4b: Learning: Structured Chat Dialog is Converted and stored in the Knowledge Base.

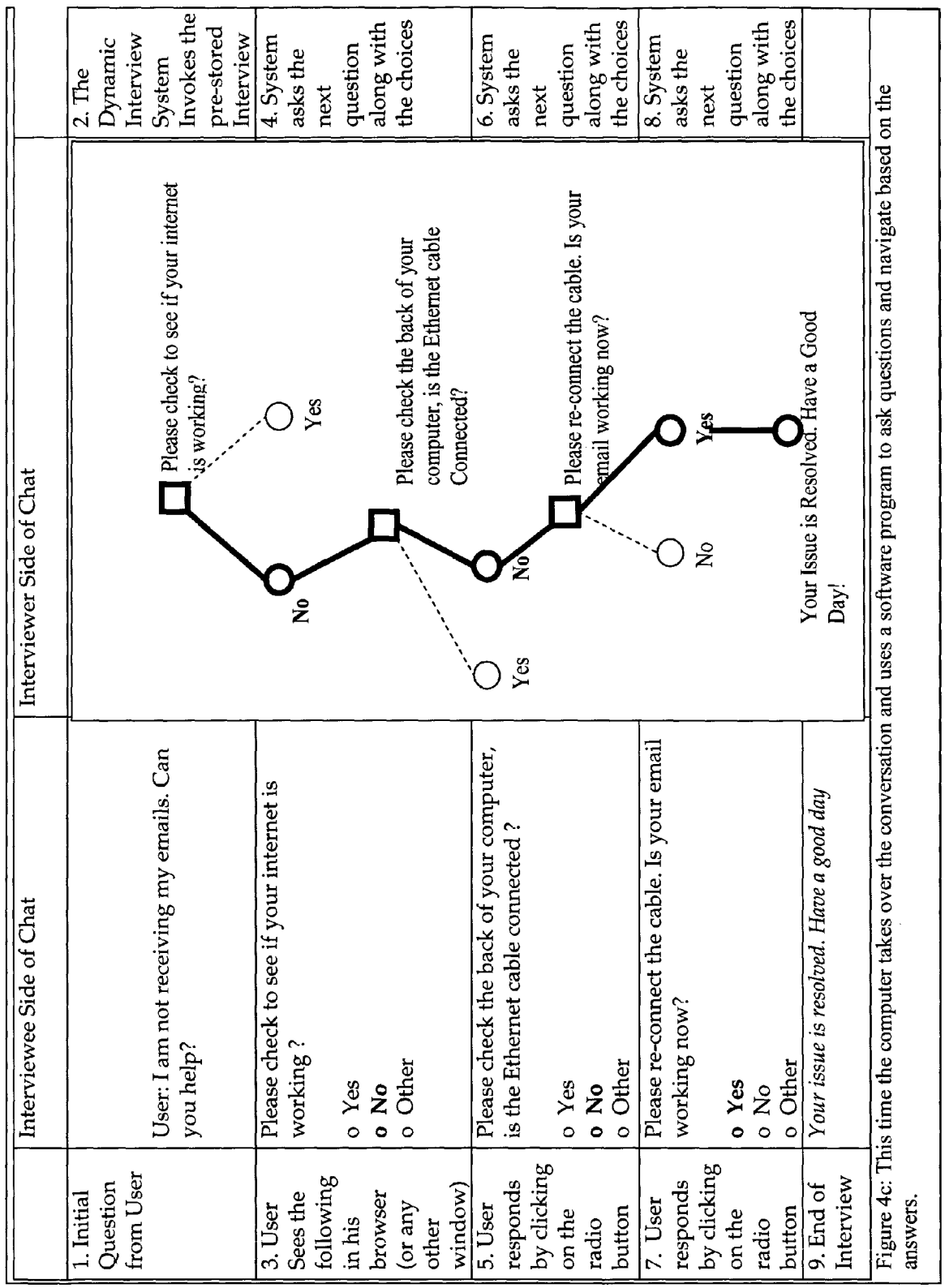
Figure 4c: This time the computer takes over the conversation and uses a software program to ask questions and navigate based on the answers.

| | Interviewee Side of Chat | Interviewer Side of Chat | |
|---|---|---|---|
| 1. Initial Question from User | User: I am not receiving my emails. Can you help? | | 2. The Dynamic Interview System Invokes the pre-stored Interview |
| 3. User Sees the following in his browser (or any other window) | Please check to see if your internet is working?<br>o Yes<br>o No<br>o Other | Please check to see if your internet is working?<br>□——○ Yes - ESCALATION<br>\<br>  ○ No | 4. System escalates to a human expert. The Expert examines and continues |
| 5. User responds by clicking on the radio button | Which Email do you use?<br>o Microsoft Outlook<br>o Yahoo<br>o Eudora<br>o Other | *User: Yes*<br><br>Question: Which Email do you use?<br><br>Choices: Microsoft Outlook, Yahoo, Eudora | 6. Expert reviews the user answer and asks the next question |
| 7. User responds by clicking on the radio button | Please check the 'Details' box to see if there are any of the following errors reported.<br>o Cannot connect to POP3 Server<br>o Cannot Authenticate User,<br>o Cannot Connect to mail server<br>o Other | *User: Microsoft Outlook*<br><br>Question: Please check the 'Details' box to see if there are any of the following errors reported<br><br>Choices: Cannot connect to POP3 Server, Cannot Authenticate User, Cannot Connect to mail server | 8. Expert determines the issue it closed, after confirming with user. |
| 9. End of Interview | *It seems your email provider's server is down. You can call them to find out when it will be back. Call us back if your problem is not solved.* | Text: It seems your email provider's server is down. You can call them to find out when it will be back. Call us back if your problem is not solved. | |

Figure 4d: Learning: When an Escalation occurs, the expert takes over and finishes the call. The system then captures all of the new Structured Chat.

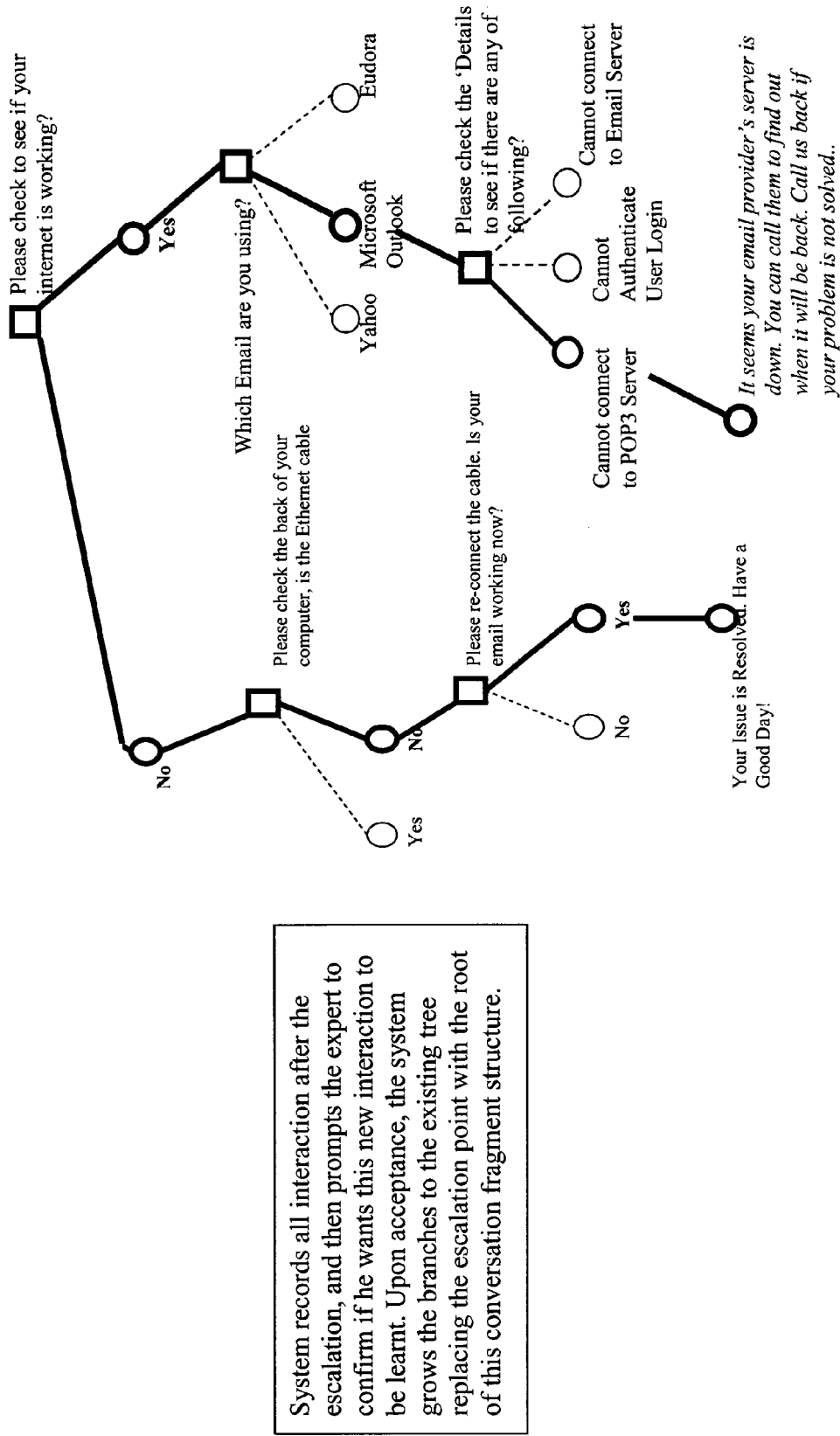
Figure 4e: Learning: Additional Structured Chat Dialog is Converted and added to the Knowledge Base.

INTERVIEW AUTOMATION SYSTEM FOR PROVIDING TECHNICAL SUPPORT

REFERENCE TO PENDING PRIOR PATENT APPLICATION

This patent application claims benefit of pending prior U.S. Provisional Patent Application Ser. No. 60/408,139, filed Sep. 3, 2002 by Himanshu Bhatnagar for INTERVIEW AUTOMATION SYSTEM FOR PROVIDING SUPPORT, which patent application is hereby incorporated herein by reference.

FIELD OF THE INVENTION

This invention relates to technical support in general, and more particularly to systems for providing technical support.

BACKGROUND OF THE INVENTION

Many enterprises find it necessary and/or desirable to provide technical support for their products. This technical support may be provided to personnel within the enterprise itself, or the technical support may be provided to entities which interact with the enterprise (e.g., to customers who purchase product from the enterprise).

It should be understood that by the term "technical support", what is meant is support being provided by a person of higher expertise to a person of lesser expertise. By way of example but not limitation, this could be a product expert assisting a new user; or an Internal Revenue Service customer support expert assisting a taxpayer filing an income tax return; or a corporate database expert assisting another employee in accessing a corporate database; or a retailer providing on-floor support to a customer for the purpose of product selection. Also, it should be appreciated that by the term "product", what is meant is both goods and/or services. And the words "customer", "user" or "clients" may be used to indicate end-users who may be a customer, an employee, a partner employee, or an agent of a company.

Unfortunately, technical support is expensive. Automating technical support, even partially, offers substantial cost savings. Significantly, the majority (84%, according to one study) of customer issues have been dealt with before. Thus, significant efforts have been made to (i) capture the knowledge base associated with recurring customer questions, and (ii) provide some sort of automated technical support using that knowledge base.

Unfortunately, it is generally very difficult to accurately capture and analyze the knowledge base associated with recurring customer questions. In addition, it is also generally very difficult to provide automated technical support which provides a satisfactory experience for the customer. Both of these difficulties are primarily due to the fact that automated human language analysis is extremely difficult, even when the domain of discourse is restricted and technical. Thus, systems that try to automate the creation of a knowledge base associated with recurring customer questions tend to be quite faulty, since they generally cannot reliably analyze the human language dialogue taking place between technical support and the customer. Furthermore, systems which try to provide automated technical support using a knowledge base generally fail to provide a satisfactory experience to the customer, since they generally cannot reliably establish a natural, efficient and accurate human language dialogue with the customer. In essence, these prior art systems do not establish a dialogue—they only go one level or question deep. If this does not yield the desired answer, the unsatisfied user must "retype" the question with more information.

Systems which try to combine both of the aforementioned tasks (i.e., to simultaneously provide automated technical support to the customer while simultaneously capturing the knowledge base associated with recurring customer questions) merely compound the difficulties associated with each separate task and have generally proven to be highly unreliable and unsatisfactory to the users.

Thus there is a need for a new and improved system for simultaneously (i) providing highly automated technical support to the customer while (ii) capturing the knowledge base associated with recurring customer questions and making it available for re-use on a continuous basis.

SUMMARY OF THE INVENTION

The present invention provides, among other things, a new and improved system for providing highly automated technical support to the customer while simultaneously capturing the knowledge base associated with recurring customer questions in a way that continuously upgrades the knowledge base.

In one form of the invention, there is provided a system for providing response-structured chat between a first entity and a second entity, comprising: a media through which the first entity and the second entity communicate with one another; and a software component disposed between the first entity and the media and adapted to convert a question and at least one proposed response into a response structure that constrains the response sent back into the media by the second entity.

In another form of the invention, there is provided a system for providing response-structured chat between a first entity and a second entity, comprising: an Instant Messaging (IM) system through which the first entity and the second entity communicate with one another, wherein the Instant Messaging (IM) system is configured to (i) transmit a question and at least one proposed response from the first entity to the second entity, and (ii) constrain the response made by the second entity to the proposed responses received by the second entity.

In another form of the invention, there is provided a method for establishing response-structured chat between a first entity and a second entity, comprising: generating a question and at least one proposed response at a first entity; converting the question and the at least one proposed response into a response structure that constrains the response; transmitting the response structure to the second entity; generating a response at the second entity using the response structure; and transmitting the response to the first entity.

In another form of the invention, there is provided a technical support system comprising: an interview database; and a dialogue mechanism for (i) presenting a question from the interview database to a user; (ii) obtaining a response to the question from the user; (iii) determining if the response is within the domain of the existing interview database; (iv) if the response is within the domain of the interview database, presenting a follow-on question from the interview database to the user; (v) if the response is outside the domain of the existing interview database, escalating the dialogue from the interview database to a human expert, where the human expert presents a question to the user; (vi) obtaining a response to the question from the user; (vii) recording the dialogue between the human expert and the user; and (viii) inserting the dialogue between the human expert and the user back into the interview database at the point of escalation so as to expand the interview database.

In another form of the invention, there is provided a method for providing technical support comprising: presenting a question from an interview database to a user; obtaining a response to the question from the user; determining if the response is within the domain of the existing interview database; if the response is within the domain of the interview database, presenting a follow-on question from the interview database to the user; if the response is outside the domain of the existing interview database, escalating the dialogue from the interview database to a human expert, where the human expert presents a question to the user; obtaining a response to the question from the user; recording the dialogue between the human expert and the user; and inserting the dialogue between the human expert and the user back into the interview database at the point of escalation so as to expand the interview database.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein:

FIG. 1 is a schematic view showing how an interviewer might present a question and several proposed answers;

FIG. 2 is a schematic view showing one possible architecture for an implementation of the present invention using an Instant Messaging (IM) medium;

FIG. 3 is a schematic view showing how a question and several proposed answers might be presented to an interviewee; and FIGS. 4A-4E illustrate an interview conducted in accordance with the present invention.

DETAILED DESCRIPTION OF THE PREFERRED EMBODIMENTS

1. Response-Structured Chat For Business Interaction

The term "structured chat" is sometimes used to describe an Instant Messaging (IM) group chat session which is controlled, to at least some extent, by a teacher or moderator who does not permit all participant entries to be transmitted to the other participants. This is to keep the group discussion on track.

The present invention uses a related, but significantly different, concept of "response-structured chat" to provide structure to a technical support dialogue. More particularly, with the "response-structured chat" of the present invention, during a technical support dialogue, the system imposes a restricted range of responses (e.g., multiple choices) on a user. By providing structure to the technical support dialogue, the system greatly simplifies the problems associated with the dual tasks of (i) providing highly automated technical support to the customer while (ii) simultaneously capturing the knowledge base associated with recurring customer questions in a way that continuously upgrades the knowledge base.

More particularly, an ordinary Instant Messaging is (IM) chat session lacks qualities such as specifying goals for a conversation and then meeting them. The dialogue typically takes a lot of time because both sides are typing, in many cases simultaneously. It is non-trivial to reuse the chat session in any form. Therefore, an ordinary Instant Messaging (IM) chat session is not suitable for automatically capturing and reusing repetitive interviewing situations.

The present invention extends the concept of chat by requiring one party to act as the interviewer and the other party to act as the interviewee. Furthermore, the system is configured so that it imposes a restricted range of responses on the interviewee, so as to establish a response-structured chat. In the preferred form of the invention, this is done by having the interviewer provide both a question and a set of possible answers or responses. The interviewee can select one of the offered choices or type in his or her own response ("other").

More particularly, as shown in FIG. 1, the interviewer has asked a question, and provided two possible answers separated by commas. The response-structured chat software (FIG. 2) reformats the inquiry, and adds the third choice "other", before pushing the entry to the interviewee (FIG. 3). The interviewee then makes a choice, in this case by a mouse click over a radio button. After the interviewee has entered a choice, it is reflected back to the interviewer.

An important advantage of the response-structured chat of the present invention relates to the specifics on both (i) the interviewer side of the dialogue, and (ii) the interviewee side of the dialogue.

First, for the interviewer, he or she can be a human expert sitting at a terminal and typing, or it could be a piece of software which can retrieve the questions and the appropriate range of possible answers from a pre-stored interview and select the next question from a tree of questions according to the customer response generated by the response-structured chat exchange. The system may also generate questions to be presented to the user. Furthermore, it is possible to switch back and forth between machine and human interviewers in the middle of a chat session in order to provide a satisfactory experience to the customer.

Second, for the interviewee, the interview can be conducted using a wide range of different media without going beyond standard and readily available technology. For example, the interview can be conducted through an Instant Messaging (IM) medium. Or the interview can be conducted by telephone, with the interview question either being spoken directly by the interviewer, prerecorded, or synthesized from text by a speech synthesizer. The interviewee may reply either by pushing a tone button, or by speaking into the telephone, since voice recognition within a multiple choice context is now a reliable technology. This approach is also useful for small screen and wireless devices and touch screen devices (e.g., PDA's, electronic notepads, tablet PC'S, kiosks and mobile data terminals, etc.) where the question can be presented on screen as print or as voice, and an answer selected from the on-screen keyboards or by clicking with a pointer or finger.

The response-structured chat interview is goal driven because it is controlled by the interviewer. It takes less time because the interviewee only clicks (where the interviewee is responding through a computer) or presses a button (where the interviewee is responding through a telephone). Significantly, because the response-structured chat session is highly structured, it can be captured in structured form for reuse.

Some applications for this new technology include: (1) online interviews; (2) business negotiations; (3) sales lead qualifications; (4) product return feedback management; (5) live online surveys; (6) online job interviews, etc.

2. Dynamic Interview Technology

The term "Interview Technology" generally refers to a structured method of interaction with an end user which does not depend on computer linguistics or keyword searches or other guesswork. An interview is an interactive session in which the computer is in charge, offering questions to the user. These questions can be well constructed in English (or any other language) because they are canned. But the user's response is always completely structured. The response is either selected from multiple choices or is the input of a specific item of information in a completely formatted style (e.g., stock name, date of sale, number of shares, etc.) supplied in formatted fields.

Turbotax™ is an example of a successful application that solves a complex structured problem using an interview process. However, this type of interview application program is not applicable to customer support situations because it solves a single problem, i.e., preparing a U.S. income tax return, using the same interview for millions of customers. Therefore, a great deal of technical expertise and interview generating skill can be deployed to create that one interview. However, to deploy interview technology for technical support requires a different approach, i.e., a dynamic interview technology, which includes the ability to quickly generate and extend many interviews in a much less labor intensive manner.

(i) Dynamic Interview Technology Which Can Easily Grow New Branches

One important aspect of the present invention is the provision of a novel dynamic interview system that can easily grow new branches whenever escalation to a human support person occurs.

To deploy dynamic interview technology for technical support, we start with two assumptions:

(1) A complete and well constructed interview will provide a pleasant experience for the user and, in many cases, lead directly to a good answer without escalation to a human support person—when the interview has properly identified the user's question, the system can provide the answer directly and/or link to many other technologies to deliver a good answer.

(2) The best way to build an extensive interview system is to capture the dialog (discourse) produced as a result of each escalation to a human, as it occurs, review it and, if it appears to be valuable, add it to the interview database. Thus, the interview database can grow new branches as new questions are encountered, thereby continually expanding the interview database. See FIGS. 4A-4E for an illustration of this process.

Significantly, the type of interview associated with the present invention never has dead ends. This is because the questions are always open-ended, in the sense that they offer choices such as "other" or "none of the above" or "I don't know". Furthermore, the terminal nodes of the interview either lead to answers or to escalation, which means that the automated knowledge tree is exhausted and a human support person is invoked.

In addition, with each answer, the user can optionally pass data by typing it into an accompanying box. The system can optionally pass this data to another system or store it in the knowledge base for future reference.

(ii) Response-Structured Chat Provides A Means For Structuring A Dialogue Between An Interviewer And An Interviewee The aforementioned response-structured chat provides an excellent means for structuring the dialogue between an interviewer and an interviewee so as to capture a multiple choice interview.

In a typical situation, the interviewer is a person knowledgeable in a specific subject area (e.g., the use of a technical product) and the interviewee is a less knowledgeable user (e.g., a client or a new employee, or a partner, or an employee from a different department) seeking to resolve a problem with the product. This example will be followed in the rest of this discussion, but it should be appreciated that the use of dynamic interview technology is not limited to this particular area. In general, dynamic interview technology is applicable in any situation in which the interviewee answers questions which may either lead to automated completion of the intended task or may require escalation to a human expert (the interviewer), based on the answers that the interviewee provides and/or whether or not he/she obtains a satisfactory result.

This technology also is not particularly sensitive to the media that the interviewee may be using. While the interviewer is most commonly seated comfortably at a desk and is using both a computer terminal and a telephone headset, the interviewee may be in an office at a desk or in the field using a hand-held wireless or a cell phone or a touch-screen device (e.g., a kiosk or a mobile data terminal). The interviewee may either be looking at a visual display or may be hearing the questions spoken. When he/she needs to reply to a multiple choice, either a keyboard, a keypad (such as from a telephone or a touch screen device), or voice activation can be used.

Whereas capturing an ordinary chat session results only in a transcribed conversation with, at best, the contributions of each participant identified and labeled, the response-structured chat session used in one form of the present invention is created by having the interviewer ask a question and provide multiple choice answers. These may include one or more escape alternatives such as "none of the above", "don't know", or "need to talk to a person". The interviewee then responds to the question by selecting one of the offered choices.

This dialogue will continue until either reaching resolution or escalation.

Resolution means that the user's needs have been identified and an answer is available. At this point, the answer can be delivered by any one of numerous means available in extant knowledge management, help desk, and/or automated teaching technologies well known in the art. For example, the answer might be available in an online FAQ ("Frequently Asked Question").

Escalation occurs when resolution fails to happen, either because no stored answer is available or because the interview failed to identify it. Upon escalation, a human expert interviewer creates additional questions and proposed answers; the interviewee selects appropriate answers from the offered choices; and the dialog continues until resolution is achieved.

The structured by-product of this interview, aside from meeting the interviewee's needs, is a multiple choice dialogue containing all the questions offered by the interviewer, all the reply choices asked by the interviewer, and all the choices made by the interviewee.

Significantly, with the present invention, and unlike all other knowledge management technologies developed to date, the interview information is always captured in a structured form. This structured form is far more useful than the prior art approach of collecting a large repository of documents and hoping that some form of automated retrieval will allow a user to find the relevant information. While the latter is sometimes necessary, may be useful, and may be what the expert (interviewer) has to do, this sort of research is frustrating to the end user. For example, it is frustrating to users of search engines who generally get far more retrievals than are relevant.

Capturing data in a structured form is clearly a more natural process than filing away undigested data; it is the way human memory works. People do not readily absorb undigested information which has not been structurally related to how they already cognize. It can also be viewed as good housekeeping; putting things in their proper place immediately, rather than just collecting them and hoping to find them later through some search process.

This invention is also different from approaches where knowledge is stored in the form of troubleshooting diagrams, directory structures, or hierarchies of questions; in those approaches, users often get frustrated with dead-ends and not having an escape if they do not agree with the options available. Another key difference is that with those traditional approaches, all of the knowledge is built a-priori and there is no chat or interview process to help in the process of building and maintaining knowledge as in the present invention.

(iii) Dynamically Building The Interview Database

The goal is to provide a satisfactory experience for the interviewee, while at the same time reducing the time spent by the interviewer repeating the same dialogue. The assumption is that most issues that arrive from clients are not new and, to the extent to which they are not, the interview can be conducted automatically, only escalating when something fresh occurs. It is quite difficult, if not impossible, to anticipate all (or even most) issues up front; therefore, the power of reuse to grow the dynamic interview is critical.

We start with the assumption that some interview base exists, even an empty one. The interviewee starts to use it and at some point it escalates to a human interviewer (where the interview base is empty, the process immediately escalates to a human interviewer). The interviewer gets to read what has happened so far, and to continue the interview. At the conclusion of the interview dialogue, the interviewer gets to review it, clean up any confusions or redundant paths, and make any other notes that may not have gotten into the interview itself.

An important aspect of the interview, which is always captured, is its point of attachment to the interview base. This is the point at which escalation occurred. If the new interview is added to the existing interview base at the point of escalation, the same issue will not need to be escalated the next time it occurs. Preparing for reuse is important, even though it takes time, because it is the best way to grow the interview base so that the interviewer does not need to repeatedly answer the same question.

While each interview conducted by a person is linear, the result of attaching many such interviews to an interview base is to grow a branching structure, as more and more choices have multiple continuations that do not escalate. The place where the dialogue escalates to a human is precisely the point where the interview base needs to grow a new branch if the interview base is to avoid escalation if and when the same question is asked in the future.

Adding the interview as a new branch of the existing interview base is called learning.

(iv) Further Applications

It should be appreciated that the present invention can be used in a wide range of situations where technical support is useful. By way of example but not limitation, the present invention could be used to enhance a Web search engine. More particularly, a query-based knowledge base, of the type disclosed above, could be used to walk the user through a series of successively more refined structured questions, whereby to "zero in" on a topic of interest and thereby enable the search engine to better locate the most relevant sites. Similarly, the approach can be used for helping users engage in an iterative dialog with a knowledgeable sales person or a product expert, to help the user in determining which product is best suited for his or her needs. For example, it may be used in a self-service kiosk in a retail environment for product selection and returns; or on a bank website to determine which credit-card is most suitable. The same approach can be used for database searching, in that it can be used to build a voice-based front-end for a legacy database application (e.g., in the healthcare, financial or insurance domains). Another application of this invention is in the government services, for example, a new tax specialist could help a taxpayer with complex situations more quickly, with a system, built on this invention, prompting the agent; or a citizen inquiring about his or her rights regarding subsidized housing, or Medicaid, etc.; or the use of hand-held-based advisory systems to help homeland security agents at border checkpoints, or FEMA agents during a disaster, etc.

A key element of this invention—the simplification of learning—will enable many different applications of the present invention.

What is claimed is:

1. A technical support system comprising:
    an interview database utilizing pre-existing branching logic, the interview database being stored on a computer; and
    a dialogue mechanism for (i) presenting a question from the interview database to a user, wherein the question comprises an inquiry and a plurality of possible responses; (ii) obtaining an answer to the question from the user, wherein the dialogue mechanism restricts the answer provided by the user to one of the plurality of possible responses provided by the dialogue mechanism; (iii) determining if the question and answer dialogue is within the domain of the existing interview database; (iv) when the question and answer dialogue is within the domain of the existing interview database, presenting a follow-on question from the interview database to the user; (v) when the question and answer dialogue is outside the domain of the existing interview database, escalating the dialogue from the interview database to a human expert, where the human expert presents a question to the user, wherein the question comprises an inquiry and a plurality of possible responses; (vi) obtaining an answer to the question from the user, wherein the dialogue mechanism restricts the answer provided by the user to one of the plurality of possible responses provided by the human expert; (vii) recording the dialogue between the human expert and the user; and (viii) inserting the dialogue between the human expert and the user back into the interview database at the point of escalation so as to expand the interview database.

2. A system according to claim 1 wherein the question is presented to the user in the form of a multiple choice question.

3. A system according to claim 1 wherein the dialogue mechanism comprises an Instant Messaging (IM) system.

4. A system according to claim 1 wherein the dialogue mechanism is configured to accept an answer from the user through the clicking of a button.

5. A system according to claim 1 wherein the dialogue mechanism comprises a telephone system.

6. A system according to claim 1 wherein the answer is entered on one from the group consisting of a touchscreen computer, a kiosk, a tablet PC, a PDA and a mobile data terminal.

7. A system according to claim 1 wherein the dialogue mechanism is configured to accept an answer from the user through the pressing of a key.

8. A method for providing technical support comprising:

presenting a question from an interview database stored on a computer to a user, wherein the question is presented to the user in a form of an inquiry and a plurality of possible responses;

obtaining an answer to the question from the user, wherein the answer is restricted to one of the plurality of possible responses;

determining if the answer is within the domain of the existing interview database;

when the answer is within the domain of the existing interview database, presenting a follow-on question from the interview database to the user;

when the answer is outside the domain of the existing interview database, escalating the dialogue from the interview database to a human expert, where the human expert presents a new question to the user, wherein the question is presented to the user in a form of an inquiry and a plurality of possible responses;

obtaining an answer to the question from the user, wherein the answer is restricted to one of the plurality of possible responses;

recording the dialogue between the human expert and the user; and inserting the dialogue between the human expert and the user back into the interview database at the point of escalation so as to expand the interview database.

\* \* \* \* \*